United States Patent [19]
Lilland

[11] 3,987,976
[45] Oct. 26, 1976

[54] STRESS MOUNTED BAIL STRUCTURE FOR OPEN FACE REELS

[75] Inventor: Larry L. Lilland, Spirit Lake, Iowa
[73] Assignee: Berkley & Company, Inc., Spirit Lake, Iowa
[22] Filed: Feb. 7, 1973
[21] Appl. No.: 330,394

[52] U.S. Cl. .................................... 242/84.21 R
[51] Int. Cl.² .................................... A01K 89/01
[58] Field of Search ............... 242/84.2 G, 84.21 R, 242/84.21 A, 84.2 R

[56] References Cited
UNITED STATES PATENTS
3,520,488  7/1970  Vouthier .................... 242/84.21 R
FOREIGN PATENTS OR APPLICATIONS
1,011,658  7/1957  Germany .................... 242/84.2 G
1,119,852  7/1968  United Kingdom ............ 242/84.2 G Primary Examiner—Billy S. Taylor
Attorney, Agent, or Firm—Orrin M. Haugen

[57] ABSTRACT

An improved line bail structure for spinning reels wherein the line bail comprises a generally resilient semicircular arm coupled to the reel rotor with the ends of the bail being stressably offset along a plane parallel to the axis of the spool spindle and also along a plane perpendicular thereto to provide torsional stresses which effect stable open and stable closed bail dispositions. The bail is coupled to the rotor through a plunger element which is adapted to automatically control the rockable rotation of the bail between open and closed dispositions upon winding. Stop means are formed along the plunger to define the stable limits for the open and closed dispositions of the bail, and with a camming ramp being secured to the reel frame to automatically rockably shift the line bail from open disposition to closed disposition upon winding and consequent rotation of the rotor.

9 Claims, 16 Drawing Figures

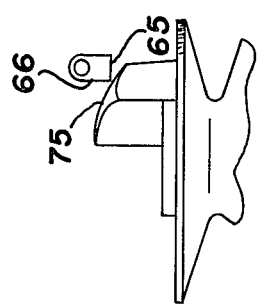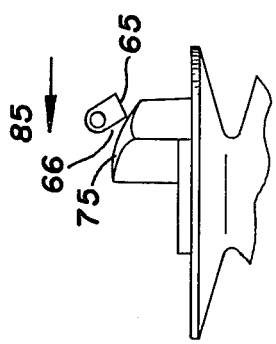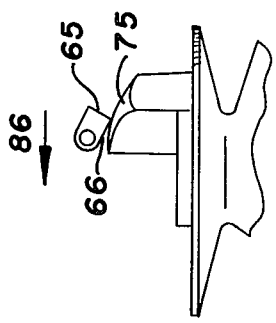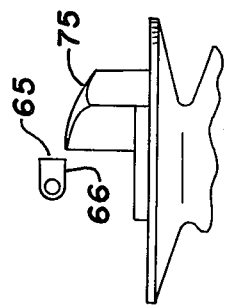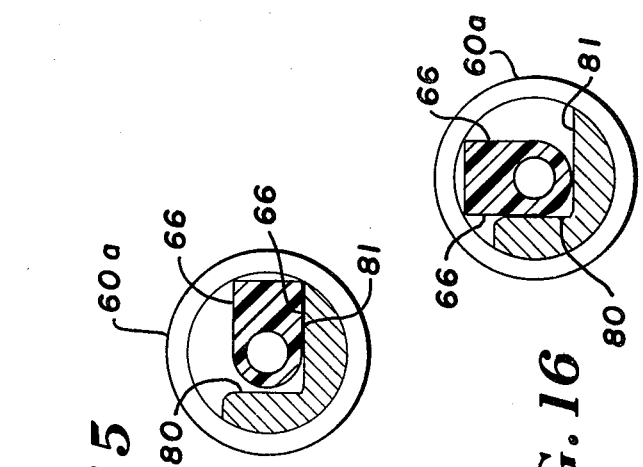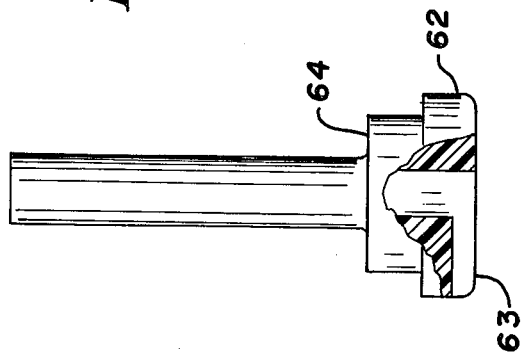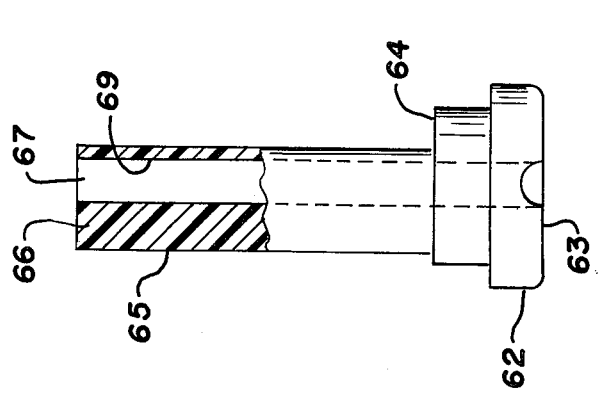

STRESS MOUNTED BAIL STRUCTURE FOR OPEN FACE REELS

BACKGROUND OF THE INVENTION

The present invention relates generally to improved fishing reel structures, and more specifically to spinning reels of the open-face type. More particularly, the present invention relates to an improved line bail assembly for an open face spinning reel wherein the line bail arm element is prepared from resilient wire material, and with the arm being mounted on the reel rotor in stressably offset relationship along a plane parallel to the axis of the spool spindle and also along a plane perpendicular thereto, such that the bail is stable in two dispositions and such that rotation of the rotor will cause a smooth rocking transfer or automatic shifting of the line bail from the open line casting mode to the closed line retrieval mode due to torsional stresses established along the length of the bail.

Open face spinning reels are widely used in sport fishing today. These reels normally employ a frame with a winding rotor secured to the frame, and with a line engaging bail rockable between a stable open line casting mode and a stable closed line retrieval mode. The bail is normally coupled to the rotor through a bail hinge, and a spring or other resilient member is attached between the hinge and the rotor housing, and is utilized to retain the bail in either open or closed modes. Normally means are provided for automatically rocking the bail from open to closed disposition upon rotation of the rotor, however, the commonly used structures frequently render it difficult to provide smooth rocking motion between bail dispositions, and unless elaborate mechanisms are provided, the user may experience difficulty in achieving simple, smooth, and effective closing of the bail. This difficulty occurs to a greater or less extent, depending upon the immediate arcuate disposition of the rotor upon initial winding.

In use, for casting, the bail is retracted or in opened disposition so as to free the line pay-out from the line receiving spool in response to motion imparted to the lure at the end of the line. The whipping action of the rod is utilized to impart this motion to the lure. In the line retrieval mode, the bail is normally disposed in a position so as to capture the line whereby continued rotation of the winding rotor accomplishes winding of the line onto the core of the line receiving spool. In other words, the bail is utilized to thread the incoming line over the bail, frequently over a line guide member, the bail being operatively coupled to the rotor. Thus, the bail is adapted to position the line in an axial disposition so that rotation of the bail relative to the line receiving spool will wrap the line onto the spool without requiring spool rotation. Frequently, open-face spinning reels are provided with means for reciprocating the spool axially, with the spool reciprocating means normally being in the form of an eccentric coupled to the main gear of the winding mechanism.

Because of the random nature of the casting operation, the final arcuate disposition of the rotor is not determined until the line retrieval operation has been completed, and hence unless the mechanism for rocking the line retrieving bail from the open casting mode to the closed retrieval mode is smooth and positive, the fisherman may experience difficulty in his initial winding of the crank and its associated mechanism to close the bail and commence line retrieval after completing the pay-out of the line in the cast.

SUMMARY OF THE INVENTION

In accordance with the preferred modification of the present invention, an improved spinning reel is provided having a line bail, the arm portion of which is generally resilient and with the ends thereof being coupled to the rotor assembly in stressably offset relationship along a plane parallel to the axis of the spool spindle and also along a plane perpendicular thereto. The bail is generally semi-circular in configuration, with the structure being provided with axially displaced inwardly directed ears or hinges which permit pivotal rotation of the line bail assembly. In this connection, however, it is anticipated that the inactive end of the line bail may be coupled to a hinge assembly which assembly is, in turn, directly coupled to the rotor. In this arrangement, therefore, it is clear that the "ends" of the line bail are mounted in offset relationship, one to another. A plunger means is coupled to the active end of the line bail, with this end portion of the line bail including a leg segment extending between the ear portion and the semi-circular arm, with the plunger being arranged to control the extent or limit of motion of the bail between open and closed dispositions. The plunger is provided with an abutment surface which defines the stable end dispositions of the bail, with the plunger further being provided with associated linkage means for automatically rocking the bail from its open line casting mode to its closed line retrieval mode upon winding of the rotor. The linkage is arranged to function in a smooth, straightforward, and positive fashion, so as to substantially reduce the friction, and thus provide for smooth changeover of functional modes.

Therefore, it is a primary object of the present invention to provide improved open-face spinning reel with smooth changeover of operational modes and with smooth positive automatic changeover from open casting mode to closed line retrieving mode.

It is a further object of the present invention to provide an improved open-face spinning reel which utilizes a line bail structure with resilient arm, the bail being operatively coupled to the rotor with the ends thereof being stressably offset along a plane parallel to the axis of the spool spindle and also along a plane perpendicular thereto, the line bail mechanism achieving a stable disposition for the bail arm in response to the torsional stresses established in the bail arm during shifting.

It is yet a further object of the present invention to provide an improved open-face spinning reel with a resilient semi-circular line bail arm having smoothly functioning cam linkages for automatically converting the line bail disposition from open line casting mode to closed line retrieval mode.

Other and further objects of the present invention will become apparent to those skilled in the art upon a study of the following specification, appended claims, and accompanying drawings.

BRIEF DESCRIPTION OF THE DRAWINGS

FIGS. 9–12 inclusive are detail sectional views illustrating the motion of the plunger as it moves arcuately past the camming ramp for rocking the line bail from open line casting mode to closed line retrieval mode;

FIG. 13 is a side elevational view, partially broken away, of the bail receiving plunger utilized in the structure of the present invention;

FIG. 14 is a side elevational view of the bail receiving plunger illustrated in FIG. 13 and taken 90° from the plane of FIG. 13;

FIG. 15 is a partial detail sectional view taken along the line and in the direction of the arrows 15—15 of FIG. 2 and illustrating the disposition of the plunger shaft and the stop surfaces formed in the rotor body, and illustrating the corresponding disposition; and FIG. 16 is a view similar to FIG. 15 and illustrating the stop disposition of the plunger shaft in the casting mode.

DESCRIPTION OF THE PREFERRED EMBODIMENT

Figure 1:
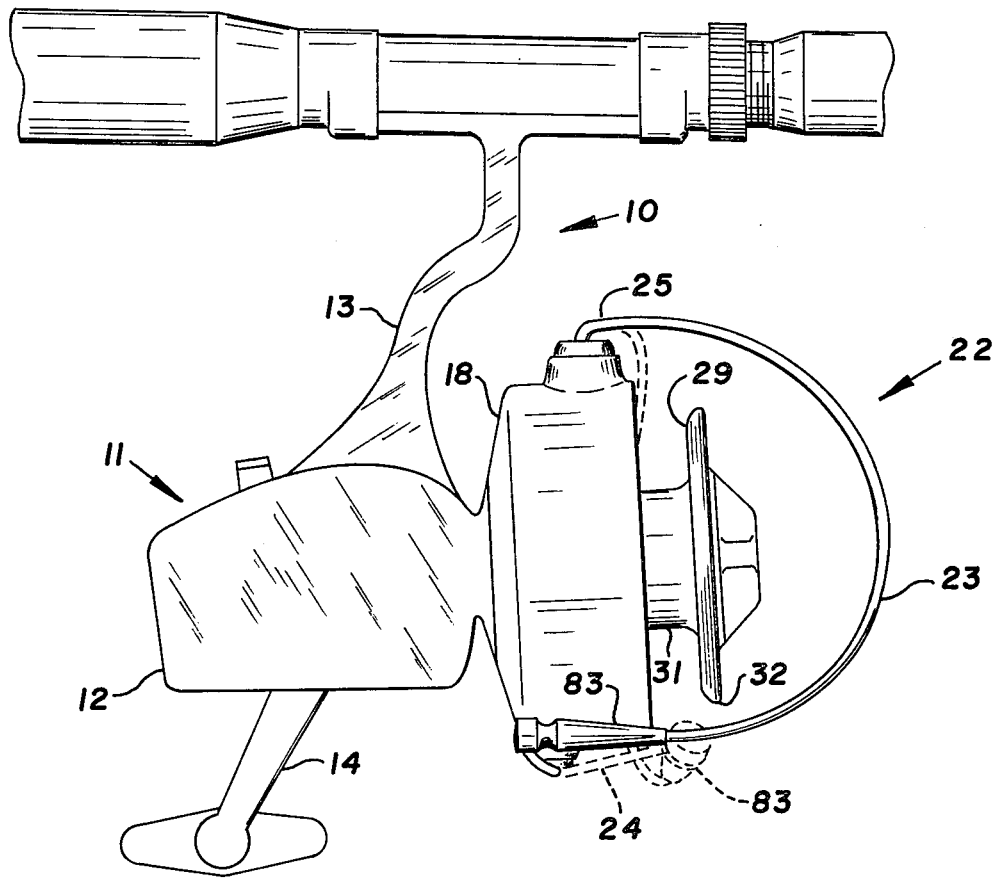
FIG. 1 is a side elevational view of a reel fabricated in accordance with the present invention, and shown mounted on a fishing rod with the forward and rear portions of the rod being broken away; and with the line bail being shown in line retrieval disposition in full lines, and in the casting mode disposition in phantom.

With attention being directed to FIGS. 1–4 of the drawings, it will be observed that the spinning reel assembly generally designated 10 includes a frame means 11 with a number of components comprising the frame 11. A housing 12 is secured to mounting post 13, with winding crank 14 being coupled to the structure, as indicated. The forward portion of the frame includes a rotor core or center 16 (FIG. 4) about which rotor assembly 17 is disposed and rotated. Rotor assembly 17 includes a hollow cup-shaped housing member 18 having a forwardly extending flange portion 19 which is circumcribed about the line spool 20. A line engaging bail assembly generally designated 22 includes a generally resilient semi-circular wire arm portion 23 along with a pair of angularly directed leg portions 24 and 25 for providing axial offset radii for the semi-circular portion of the resilient bail. The leg portions 24 and 25 terminate in inwardly directed mounting ear segments 26 and 27, respectively, which, as indicated, are mounted to extend inwardly along individual axes, each of which is generally mutually offset from the normal relaxed diameter of the semi-circular arm 23.

Line spool 20 is provided with forward and rearward flanges 29 and 30, along with a core 31. An outwardly contoured pay-out lip is also provided as at 32. The core 31 of spool 20 is mounted upon the forward end of spindle 33, as shown at 34, with an adjustable drag assembly being provided for adjustably controlling the extent of resistance to rotation of the line spool 20 on spindle portion 34. The drag assembly includes a forwardly disposed drag knob 36, having a rear portion which engages drag washer 37, drag washer 37 in turn being forced against felt washer 38. An O-ring 39 is provided to retain drag knob 36 in its proper disposition. A spacer washer may be employed as at 40, between the forward face surface of toothed gear 41 and inner core 42 of spool 20. Clicker pick 44 is provided to audibly indicate relative rotational motion between line spool 20 and spindle 33, with the clicker pick 44 being secured to the rear flange 30 of spool 20, and engaging the individual teeth of gear 41.

Figure 4:
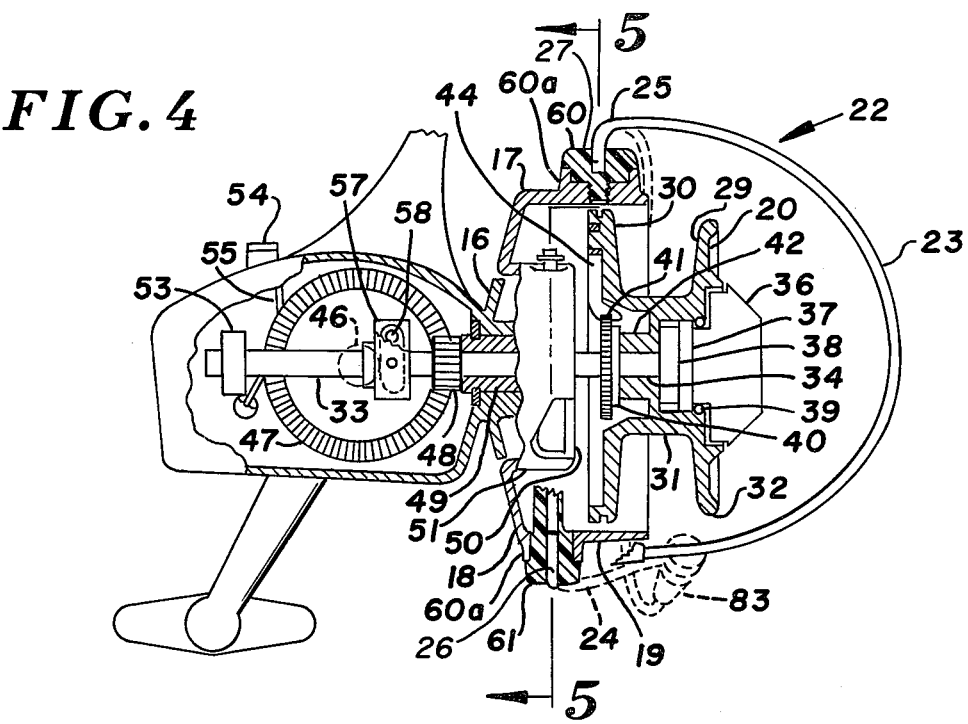
FIG. 4 is a side elevational view of the reel shown in FIG. 1, and with the rotor and line spool portions being shown in section, and with a portion of the frame housing being cut away to illustrate certain details of the winding mechanism.
Figure 5:
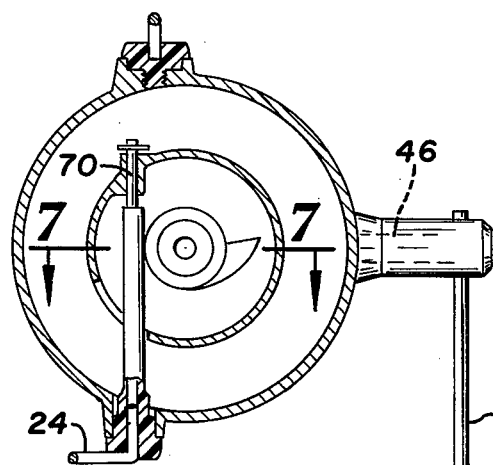
FIG. 5 is a vertical sectional view taken along the line and in the direction of the arrows 5—5 of FIG. 4.

As is conventional in spinning reels, particularly open-face spinning reels, winding crank 14 is coupled to associated mechanical linkages for causing the rotor assembly to rotate, as well as for providing the line spool mounting means to axially reciprocate. Specifically, and as indicated in FIGS. 1, 4 and 5, winding crank 14 is secured to shaft 46, with face gear 47 being fast upon shaft 46. The teeth of face gear 47 are in mesh with pinion 48, pinion 48 being, in turn, secured to rotating sleeve 49 and coupled to rotor 18 through disk 50 and flange 51. Flange 51 is provided with bores for guidably receiving a plunger portion of the bail assembly 22, as will be described in greater detail hereinafter.

Spindle 33 has its inner end passing through a bore formed in guide 53 as shown in FIG. 4 with guide 53 being preferably cast integrally with the frame 11. A conventional anti-reverse notch engaging lever is illustrated at 54, with the lever achieving bi-stable positioning by virtue of leaf spring 55. The conventional slide guide or yoke 57 is utilized to couple spindle shaft 33 to eccentric post 58, with this slide guide providing the axial reciprocating motion of line spool 20 upon rotation of face gear 47.

Figure 6:
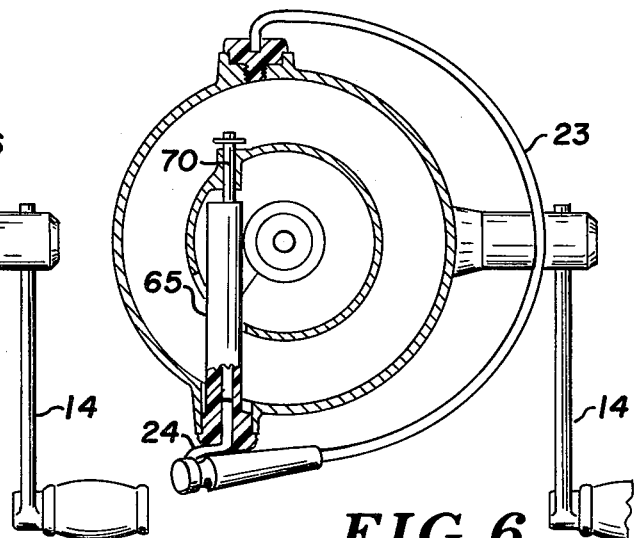
FIG. 6 is a vertical sectional view taken along the line and in the direction of the arrows 6—6 of FIG. 4.
Figure 7:
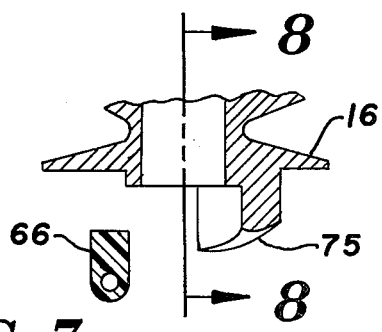
FIG. 7 is a detail vertical sectional view taken along the line and in the direction of the arrows 7—7 of FIG. 6, and illustrating the details of the camming ramp utilized to rockably rotate the line bail from line casting mode to line retrieval mode.
Figure 8:
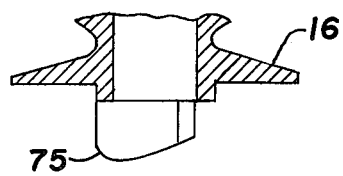
FIG. 8 is a horizontal sectional view taken along the line and the direction of the arrows 8—8 of FIG. 7, and illustrating the camming ramp along a horizontal plane.

Detailed attention is now directed to FIGS. 4, 5 and 6 for a description of the line bail assembly 22. As has been indicated, the line bail assembly 22 comprises a generally resilient semi-circular arm 23 with the end portions of the arm 23 being stressably mounted so as to be offset in two coordinates of planes from the normal relaxed disposition of arm 23. The extent of this offset from normal relaxed disposition is shown in FIGS. 4 and 5. The line bail is operatively retained within the winding rotor by hub and cup means 60 and 60A. Hub and cup means 60 and 60A are arranged in generally offset opposed relationship and receive the ear segments 26 and 27 of bail arm 23 in bores formed therewithin. As is apparent in FIG. 4, angularly offset leg portion 24 of bail assembly 22 is received within a slot formed in the face of plunger 61, which, as will become apparent hereinafter, is in the form of a rotatable plunger element. The torsional stresses established in the arm 23 provide a dead spot between the open and closed position. At the dead spot, the bail is unstable and is free to open or close, depending upon the force which is being applied to the structure at the point of reaching the "dead spot". In this connection, the dead spot finds the point at which the directional forces change, and continued motion in the direction of the open or closed positions will tend to relax the forces establishing strain in the structure.

Figure 2:
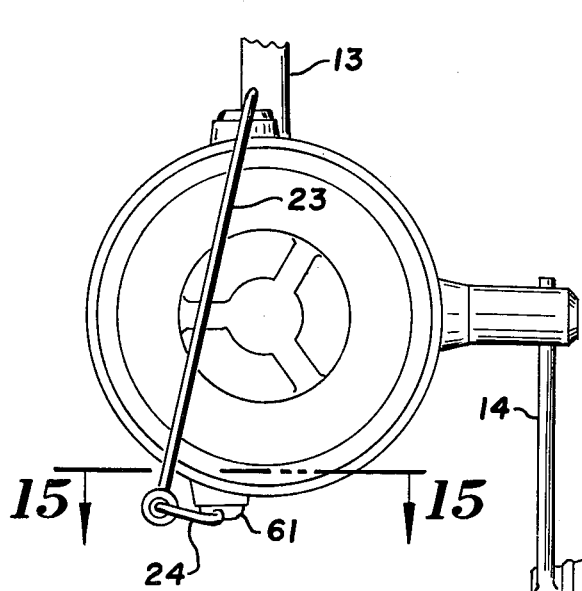
FIG. 2 is a front elevational view of the reel illustrated in FIG. 1 and illustrating the line bail in closed line retrieval mode or disposition.
Figure 3:
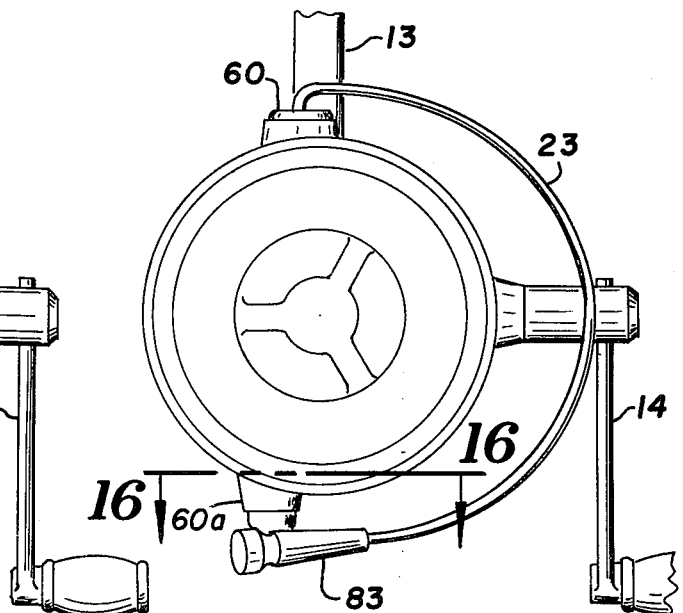
FIG. 3 is a view similar to FIG. 2 and with the line bail being shown in open or casting mode.

The details of plunger element 61 are illustrated in FIGS. 13 and 14, and will be referred to briefly at this point. Plunger 61 which is received within rotor 18 in cup 60A includes a head portion 62 with an outer exposed face 63 and an annular inner surface 64. Annular inner surface 64 meets shank portion 65 of plunger 61 which is provided with a radially asymmetric portion 66 about the central axis 67 of plunger 61. The purpose of radially asymmetric portion 66 will be made more fully apparent hereinafter. It will be noted that rotating plunger 61 is provided with a pin receiving bore 69, with a pin 70 being received therewithin (FIG. 2).

Particular attention is now directed to FIGS. 5–8, inclusive, which illustrate the disposition of the arcuate camming ramp which is provided at the forward end of the housing, and particularly forward of the rotor center 16. Arcuate camming ramp 75 is illustrated in FIGS. 4–6, inclusive, and is adapted to engage asymmetric shank portion 66 of plunger 61. As is indicated in the drawing, arcuate camming ramp is approximately 90° in arcuate length and thus provides an elongated cam surface for smooth positive engagement with radially extending portion 66 of plunger 61. For reducing frictional forces, since arcuate camming ramp 75 is normally formed of metal, plunger 61 is preferably formed of a synthetic plastic resin material such as Delrin plastic which is an acetal resin of composition ($-OCH_2-$)$_n$ derived by polymerization of formaldehyde. Delrin resins are, of course, commercially available. It will be further appreciated that other durable low friction resins such as, for example, nylon, polytetrafluoroethylene or certain polyolefins may be employed as well.

Attention is now directed to FIGS. 9–12 inclusive, wherein the action and motion of plunger 61 and arcuate camming ramp 75 are explained. In this connection, as the plunger approaches the camming ramp (FIG. 9) the radially asymmetrical portion 66 makes initial contact and starts its rocking counter-clockwise rotation. FIGS. 10 and 11 illustrate continued arcuate travel of plunger 61, along with the disposition as it continues this arcuate travel in the direction indicated by the arrows, for example, arrows 85 and 86. Upon completion of the travel of plunger 61 past ramp 75, as indicated in FIG. 12, the full extent of rockable rotation has occurred, with this rocking rotation covering a total of approximately 90° of arcuate axial rotation. This extent of travel is appreciated as being substantially equivalent to the arcuate distance between the closed and open dispositions for the line bail.

With particular attention being directed to FIGS. 1 and 4 of the drawings, it will be apparent that the normal or "relaxed" dispositions of the arm 23 lie beyond the stable stop positions. With attention being directed to FIGS. 15 and 16 of the drawings, it will be seen that the shank portion 66 of plunger 61 makes contact with abutment surface 80 and 81 formed within cup 60A. In this connection, therefore, the throw of the bail will tend toward a relaxed position on either side of the stable rest positions as determined by the stop surfaces 80 and 81. The bi-stable dispositions for the bail are achieved by virtue of the use of combined stressed offsets for the bail arm assembly in two coordinates of planes. In other words, the term "offset" as utilized in connection with the bail assembly, refers to a mounting disposition which is one which is offset from the normal or relaxed position of the bail arm, thereby providing the continued presence of torsional stresses in the arm during the operation of the reel. Thus, torsional stresses are present at all times in the arm and the dead spot which is intermittent the open and closed disposition refers to the position where the torsional stresses are at their maximum, and merely change directions at this point. It will be apparent, therefore, that the "at rest" position of the bail will be substantially 180° opposed from the dead spot existing arcuately midway between the open and closed dispositions for the bail.

FIGS. 4 and 5 illustrate the extent of the offset for the bail arm 23. The extent of offset in a plane parallel to the spindle axis is illustrated in FIG. 4, with offset in a plane transverse to the spindle axis being illustrated in FIG. 5. It will be appreciated that the normal or relaxed disposition is remote from that shown in the drawings.

In operation, therefore, the user, when desiring to initiate a cast, will open the bail assembly 22 to the disposition illustrated in FIGS. 1 and 4, and will complete his cast. Upon initial rotation of winding crank 14, rotor housing will carry plunger 61 past ramp 75 and will accordingly rock bail assembly 22 from open disposition to closed disposition. The closed disposition is illustrated in phantom in FIG. 1.

If desired, the bail arm portion 23 may carry a line guide such as illustrated at 83 in FIG. 1, it being appreciated, of course, that such guides, while desirable, are not necessary nor critical to the operation.

The apparatus of the present invention provides an inexpensive, efficient, reliable and positive bail actuating mechanism. This bail actuating mechanism is smooth-acting and provides modest additional resistance to winding motion when the bail arm is being forceably rocked from open line casting disposition to closed line retrieval disposition.

I claim:

1. In a spinning reel having frame means, a winding rotor assembly operatively coupled to said frame means, a resilient line engaging bail rockable between a stable open line casting mode and a stable closed line retrieval mode, stressably offset bail mounting means for inducing torsional stresses in said bail and cooperating stop means for resiliently forcing said line engaging bail into either one of said stable modes, a line spool mounting spindle and a line spool retained upon said spindle, a winding crank and associated mechanical linkages for causing said winding rotor assembly to rotate and the line spool mounting spindle to axially reciprocate the line spool for re-winding the line;

a. said frame means including a base housing assembly with said spindle means being secured thereto and being disposed generally coaxially with said rotor and with a portion of said spindle means extending generally forward of said base housing assembly for receiving said line spool thereon;

b. said line bail comprising a generally resilient semi-circular arm with a normal relaxed disposition situated substantially 180° opposed from a disposition generally arcuately midway between said open and closed modes respectively, said arm having a predetermined radius and terminating in a pair of angularly disposed chordal leg portions, at least one of said leg portions terminating in a radially inwardly extending mounting segment;

c. said winding rotor being arranged to operatively retain said line bail and having offset opposed mounting means comprising first and second opposed hub means for receiving the terminal ends of said leg portions of said line bail and for permitting limited pivotal rotation of said terminal ends therewithin, said opposed hub means mounting said bail in a disposition stressably offset along the axis of the spool mounting spindle and also along a plane perpendicular to said axis and taken through the diameter of said rotor so as to define a normal relaxed disposition for said line bail which is arcuately spaced substantially 180° opposed from a disposition generally arcuately midway between said open and closed modes respectively for resiliently biasing said bail arm toward open or closed dispositions;

d. said first hub means comprising a rotatable plunger received within a plunger receiving cup formed within said winding rotor, with said cup having first and second angularly disposed abutment surfaces for controlling the extent of rotation of said bail between open and closed modes, motion limit means coupled to said plunger and extending radially of the axis thereof for contacting said abutment surfaces when said line bail is in full open or full closed dispositions.

2. The spinning reel as defined in claim 1 being particularly characterized in that said radially extending motion limit means is a radially extending rib.

3. The spinning reel structure as defined in claim 1 being particularly characterized in that said base housing assembly has plunger actuating means disposed adjacent the forward end thereof, and being adapted to engage said motion limit means for arcuate rotation of said plunger about the central axis of said shank upon rotation of said winding rotor for rocking said line bail from said open line casting mode to said closed line retrieval mode.

4. The spinning reel structure as defined in claim 3 being particularly characterized in that said plunger actuating means is a generally arcuate camming ramp.

5. The spinning reel structure as defined in claim 4 being particularly characterized in that said generally arcuate camming ramp has an arcuate length of approximately 90°.

6. The spinning reel structure as defined in claim 3 being particularly characterized in that said arcuate camming ramp is disposed in axial disposition for contacting said radially asymmetric plunger portion only when said line bail is disposed in open line casting disposition.

7. The spinning reel structure as defined in claim 1 being particularly characterized in that said plunger outer surface has a radially extending bail leg receiving slot formed therein.

8. The spinning reel structure as defined in claim 1 being particularly characterized in that said plunger is provided with an axially extending anchoring means secured adjacent the inner end of the plunger shank.

9. The spinning reel structure as defined in claim 1 being particularly characterized in that said plunger is fabricated of a synthetic plastic resinous material having a surface with a low coefficient of friction.

* * * * *